(12) United States Patent
Zhang et al.

(10) Patent No.: US 8,630,356 B2
(45) Date of Patent: Jan. 14, 2014

(54) HIGH PERFORMANCE LOOP FILTERS IN VIDEO COMPRESSION

(75) Inventors: Renqi Zhang, Hong Kong (CN); Wai Kuen Cham, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 384 days.

(21) Appl. No.: 12/984,464

(22) Filed: Jan. 4, 2011

(65) Prior Publication Data

US 2012/0170668 A1 Jul. 5, 2012

(51) Int. Cl.
*H04N 7/12* (2006.01)

(52) U.S. Cl.
USPC . 375/240.29; 375/241; 375/242; 375/240.26; 348/488

(58) Field of Classification Search
USPC .......................................... 375/240.29, 240.26
See application file for complete search history.

(56) References Cited

U.S. PATENT DOCUMENTS

| | | | |
|---|---|---|---|
| 7,167,522 B2 | 1/2007 | Webb | |
| 7,283,588 B2 | 10/2007 | Bjontegaard | |
| 8,259,819 B2 * | 9/2012 | Liu et al. ................... | 375/240.29 |
| 2005/0013376 A1 * | 1/2005 | Dattani et al. ........... | 375/240.24 |
| 2005/0013494 A1 | 1/2005 | Srinivasan et al. | |
| 2007/0116374 A1 * | 5/2007 | Despain ........................ | 382/261 |
| 2008/0025632 A1 | 1/2008 | Bjontegaard | |
| 2008/0056389 A1 | 3/2008 | Chiang et al. | |
| 2008/0117981 A1 | 5/2008 | Lee et al. | |
| 2008/0123750 A1 | 5/2008 | Bronstein et al. | |
| 2009/0067495 A1 * | 3/2009 | Au et al. ................... | 375/240.12 |
| 2009/0116546 A1 * | 5/2009 | Park et al. ................ | 375/240.01 |
| 2009/0161756 A1 * | 6/2009 | Lin ........................... | 375/240.02 |
| 2010/0158103 A1 * | 6/2010 | Ye et al. .................... | 375/240.02 |
| 2010/0254463 A1 * | 10/2010 | Narroschke et al. ..... | 375/240.29 |
| 2010/0284464 A1 * | 11/2010 | Nagori et al. ............ | 375/240.15 |
| 2011/0026600 A1 * | 2/2011 | Kenji ........................ | 375/240.24 |
| 2011/0026611 A1 * | 2/2011 | Kenji ........................ | 375/240.29 |

OTHER PUBLICATIONS

Zia et al, Efficient Quadtree Based Block-shift Filtering for Deblocking and Deringing, Nov. 2009.*
Kuan et al, Adaptive Noise Smoothing Filter for Images with Signal-Dependent Noise, Mar. 1985.*
Marpe et al, Video Compression Using Nested Quadtree Structure, Leaf Merging and Improved Techniques for Motion Representation and Entroy Coding, 2010.*
Cham et al, On Compatibility of order-8 Integer Cosine Transforms and the Discreate Cosine Transform, 1990.*

(Continued)

*Primary Examiner* — Andy Rao
*Assistant Examiner* — Shan Elahi
(74) *Attorney, Agent, or Firm* — Knobbe, Martens, Olson & Bear, LLP (57) ABSTRACT

Disclosed are a filter and a method to improve the objective and subjective video coding performance The filter comprises: a parameter estimation unit configured to determine means and variances from a pilot frame; a filter unit configured to receive quantized residual coefficients in video coding process and restore coefficients from the quantized residual coefficients and the determined means and variances; an inverse ICT unit configured to apply an inverse ICT to the restored coefficients to obtain a filtered frame; a rate-distortion optimization unit configured to determine a quadtree block partition index; and an adaptive block selection unit configured to select final blocks according to quadtree block partition index, the final blocks being utilized to form the filtered frame.

16 Claims, 9 Drawing Sheets

(56) References Cited

OTHER PUBLICATIONS

Chen et al, Classified Quadtree-based Adaptive Loop Filter, 2011.*
Zhai et al, Efficient Quadtree Based Block-shift Filtering for Deblocking and Deringing, Nov. 2009.*
Qiu et al, Speckle Noise Reduction in SAR Imagery Using a Local Adaptive Median Filter, 2004.*
Markus et al, Performing evaluation of several adaptive speckle filters for SAR imaging, 2009.*
Bernardini et al, Frame-Based Multiple-Description Video Coding with Extended Orthogonal Filter Banks, 2006.*
Lauterbach et al, Mobile Reception of Digital AM Audio and Data services using Long-Range Skywave propagation, 2007.*
Toshiba Corporation. "Quadtree-based adaptive loop filter." International Telecommunication Union, Telecommunication Standardization Sector, COM 16-C 181-E. Jan. 2009, 4 pages.
Dorea, et al. "A direction-adaptive in-loop deartifacting filter for video coding." ICIP, pp. 1624-1627, 15th IEEE International Conference, Oct. 12-15, 2008.
Guleryuz, O. G. "A nonlinear loop filter for quantization noise removal in hybrid video compression." Proc. IEEE Int'l Conf. on Image Proc. (ICIP2005), Genova, Italy, Sep. 2005, 4 pages.
List, et al. "Adaptive deblocking filter." IEEE Transactions on Circuits and Systems for Video Technology, 13(7):614-619, Jul. 2003.
Wittmann, et al. "Transmission of post-filter hints for video coding schemes." Proceedings of the International Conference on Image Processing, ICIP 2007, Sep. 16-19, 2007, San Antonio, Texas, USA. IEEE 2007, pp. 81-84.
Xu, et al. "Sparsity-based deartifacting filtering in video compression." Image Processing, 16th IEEE International Conference, ICIP, Nov. 7-10, 2009, pp. 3933-3936.
Zhang, et al. "Image postprocessing by non-local Kuan's filter." *J. Vis. Commun. Image R.*, 22:251-262, 2011.

* cited by examiner

Fig. 1
(The prior art)

(a) I frame  (b) P frame  (c) B frame

(a) H.264 coded frame  (b) QALF+DLF filtered frame
(c) QNLK filtered frame  (d) QOCNLK filtered frame

HIGH PERFORMANCE LOOP FILTERS IN VIDEO COMPRESSION

TECHNICAL FIELD

The application relates to High Performance Loop Filters in video compression.

BACKGROUND

Image and video, when they are transmitted or stored, are always represented in compressed form because of their huge size. Block-based transform coding is the most widely used compression method for images. The order-8 DCT is first employed to compact signal energy and then a quantization process is applied on the transform coefficients. Block-based transform coding is also widely used for video data which will first be compressed using intra/inter-frame prediction to further compact the signal energy. Then quantization is performed on the residual transform coefficients of video signal. Such video coding method is often called hybrid video coding for its use of both transform and predictive coding. Hybrid video coding is adopted by most video coding standards including H.264/AVC. In both image and video coding systems, quantization is the main source causing the coding artifacts such as blocking and ringing artifacts.

In order to reduce artifacts in hybrid video coding, there are two main approaches in integrating deblocking filters into video codecs. Deblocking filters can be used as postprocessing filters or loop filters. Postprocessing filters only operate on the display buffer outside the coding loop, and thus are not normative in the standardization process. Loop filters operate in the coding loop and filtered frames are used as reference for subsequent coded frames. Loop filters which are used in both encoding and decoding operations need to be specified in the standardization process.

FIG. 1 illustrates a block diagram of the encoder of H.264/AVC. As shown, an input video frame $F_n$ is presented for encoding and is processed in units of macroblock. $F_n$ is compared with a reference frame, for example, the previous encoded frame $F_{n-1}'$ by the a motion estimation 100, and then a motion compensated prediction P is generated through the conventional processes of a motion compensation unit 200 and an intra prediction unit 300.

P is subtracted from the current macroblock to produce a residual block that is transformed by a transform unit 400 and then quantized by the quantization unit 500. The quantized transform coefficients are entropy coded by the entropy encoder 600. The quantized residual coefficients are obtained after inverse quantization by the unit 700. Then the coefficients are inversely transformed by the inverse transformation unit 800 to produce a quantized residual block. The motion compensated prediction P is added to the quantized residual block to create a reconstructed block. A loop filter 900 is applied to reduce the effects of blocking distortion and the reconstructed reference frame is then created from a series of reconstructed blocks.

In general, better performance can be obtained using loop filter than postprocessing filter.

Early loop filters were designed using enhancement-based approaches to reduce coding artifacts. They applied low-pass filters near block boundaries. In the art, a deblocking loop filter (DLF) was proposed and adopted by H.264/AVC standard. It operates by performing an analysis of the samples around a block boundary and adapts filtering strength of low-pass filters at the boundary of each block. However, these enhancement based techniques do not result significant subjective visual quality or objective Peak Signal-To-Noise Ratio (PSNR) improvements.

Restoration-based techniques were also proposed to suppress the quantization noise optimally. The optimal linear Wiener filter is a well-known technique to suppress noises. It was proposed to reduce quantization noise in video as post-processing filters or loop filters. Significant objective quality improvement can be achieved by the restoration-based techniques. Wiener filtering requires knowledge of auto-correlation and cross-correlation of original signal and noise, so filter coefficients need to be transmitted in the bit stream of a video coding scheme. On the decoder side, the filter coefficients are extracted from the bit stream to construct the optimal Wiener filter. As a significant number of bits are required for the representation of filter coefficients, so one optimal Adaptive Loop Filter (ALF) is used for one frame. The ALFs can reduce the average distortion of each frame globally, but it cannot adapt to different local regions within a frame.

A variety of adaptive methods to consider different local regions within a frame were developed. Block Matching 3-Dimensional (BM3D) method uses Wiener filter thresholding to restore 3-D Discrete Cosine Transform (DCT) coefficients grouped by block matching and has obtained excellent performance on image denoising. In "*Sparsity-based Deartifacting Filtering in Video Compression*" of Jun Xu, Yunfei Zheng, Peng Yin, Joel sole, Cristina Gomila and Dapeng Wu, *IEEE Int. Conf Image Process* (*ICIP*2009), Cairo, Egypt, November 2009, it shows that BM3D method only works well for intra coded frames as a postprocessing tool. An effective way to use BM3D method as loop filters both for intra and inter coded frames has not been found.

Block-based adaptive methods were also proposed. A representative method is the quadtree-based adaptive loop filter is described by T. Chujoh, N. Wada, and G. Yasuda, in "*Quadtree-based adaptive loop filter*", *ITU-T SG*16 *Contribution*, C181, Geneva, January 2009, and is one of the coding efficiency improvement tools in the Key Technical Area (KTA) software. Quadtree-based adaptive loop filter (QALF) allows a block filtered or not filtered and represents the side information using a quadtree. Further improvement is provided by another tool in the KTA software, which is called quadtree-based adaptive loop filter with deblocking loop filter (QALF+DLF). The scheme allows a block to be filtered by ALF or DLF. The side information is also represented using a quadtree. The scheme achieves state-of-the-art performance both on objective and visual quality improvement. However, the block-based method does not fully capture local statistics of an inhomogeneous frame.

Non-local Kuan's (NLK) filter is designed based on minimum mean square error (MMSE) restoration. It is proposed by Renqi Zhang, Wanli Ouyang and Wai-kuen Cham in "*Image Postprocessing by Non-local Kuan's Filter*", *Journal of Visual Communication and Image Representation*, Elsevier, accepted for publication. The filter works by capturing local self-similarity property in a picture. Based on the NLK filter, two image postprocessing methods, DNLK and OCDNLK filters, are proposed. Both the two methods use dual layer filtering process. The OCDNLK filter combines the advantage of the overcomplete transform and the DNLK filter. They all achieve the state-of-the-art performance on image postprocessing.

SUMMARY

In one aspect, the application discloses a video loop filter comprising:

a parameter estimation unit configured to determine means and variances from a pilot frame;

a filter unit configured to receive quantized residual coefficients in video coding process, and restore coefficients from the quantized residual coefficients and the determined means and variances; and an inverse ICT unit configured to apply an inverse ICT to the restored coefficients to obtain a filtered frame.

In another aspect, the application discloses a method for improving video coding performance, comprising:

estimating means and variances from a pilot frame;

retrieving quantized residual coefficients in video coding process;

restoring coefficients from quantized residual coefficients and the determined means and variances; and applying an inverse ICT to the restored coefficients to obtain a filtered frame.

BRIEF DESCRIPTION OF DRAWINGS

FIG. 1 shows H.264/AVC encoder in the prior art.

FIG. 2 illustrates shifted block representations for blocks in the image in the prior art.

FIG. 3 illustrates a block diagram of the DNLK filter according to the prior art.

FIG. 4 illustrates a block diagram of the NLK loop filter according to one embodiment of the application.

FIG. 5 shows the operation to obtain residual blocks.

FIG. 6 shows a quadtree block partition example.

FIG. 7 illustrates a block diagram of a quadtree-based NLK (QNLK) filter according to one embodiment of the application.

FIG. 8 illustrates a quadtree-based block partition for I, P, B coded frames of the CIF sequence Carphone.

FIG. 9 illustrates R-D curves for a coded sequence Foreman.

FIG. 10 illustrates R-D curves for a coded sequence Akiyo.

FIG. 11 and FIG. 12 illustrate experiments of visual quality comparison for Carphone and Football sequences, respectively.

DETAILED DESCRIPTION

Embodiments of the present invention will be described with reference to the accompanying drawings, but these drawings are presented only for the illustrative purpose and in no respect, are intended to limit the present invention anymore.

For ease of understanding of the embodiments of the application, the principle of the Non-Local Kuan (NLK)'s filter is described first as below.

Figure 2:
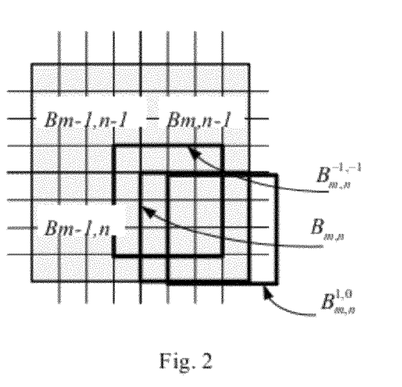

Let $B_{m,n}$ be a M×M block at the mth block row and nth block column in an frame, and $B_{m,n}^{k,l}$ be the block with k shifts in a horizontal direction and l shifts in a vertical direction, relative to the block $B_{m,n}$. FIG. 2 gives two examples with k=−1, l=−1 and k=1, l=0 respectively. The block-based transform was applied on each of the shifted blocks. Hence, for each quantized coefficient $y_0$ in $B_{m,n}$, its neighboring coefficients $y_i$, i=1, 2, . . . , k can be obtained from the shifted blocks $B_{m,n}^{k,l}$.

Considering a noise model y=x+n, where vector n represents the noises, vector y contains the quantized coefficient $y_0$ and its neighboring coefficients $y_i$, i=1, 2, . . . , K from shifted blocks, and vector x contains the corresponding original coefficients $x_0$ and $x_i$, i=1, 2, . . . , K. According to the linear minimum mean square error (LMMSE) estimator, it will have $$\hat{x}_{LMMSE} = (\hat{x}_0, \hat{x}_1, \ldots, \hat{x}_K)^T = E[x] + C_{xy} C_y^{-1}(y - E[x]), \quad (1)$$

where E[x] is the expected mean of x, $C_{xy}$ is the cross-covariance between x and y, and $C_y^{-1}$ is the inverse of the auto-covariance of signal y.

Under a well-known assumption that the original coefficients x and quantization noise n are uncorrelated, the LMMSE filter becomes a point-wise NLK filter:

$$\hat{x}_0 = \bar{x}_0 + \frac{\sigma_{x_0}^2}{\sigma_{x_0}^2 + \sigma_{n_0}^2}(y_0 - \bar{x}_0). \quad (2)$$

Hence, the filter does not calculate every element in $\hat{x}_{LMMSE}$ but just $\hat{x}_0$, which is a LMMSE estimation for the quantized coefficient $y_0$. Uniformly distributed quantization noise model is widely used by various methods, so the noise variance $\sigma_{n_0}^2$ for the quantized coefficient $y_0$ can be determined from the specific quantization step $Q_0$ as shown below:

$$\sigma_{n_0}^2 = Q_0^2/12. \quad (3)$$

The means $\bar{x}_0$ and variances $\sigma_{x_0}^2$ are estimated by non-local technique as shown in equations (4) and (5), respectively.

$$\bar{x}_{m,n}(u, v) = \sum_{k=-L}^{L} \sum_{l=-L}^{L} w_{m,n}^{k,l} x_{m,n}^{k,l}(u, v). \quad (4)$$

$$\sigma_{x_{m,n}(u,v)}^2 = \sum_{k=-L}^{L} \sum_{l=-L}^{L} w_{m,n}^{k,l} [x_{m,n}^{k,l}(u, v) - \bar{x}_{m,n}(u, v)]^2. \quad (5)$$

The weight $w_{m,n}^{k,l}$ is defined as $$w_{m,n}^{k,l} = \frac{1}{Z_{m,n}} \exp\left(-\frac{\sum_{u=0}^{M-1} \sum_{v=0}^{M-1} |x_{m,n}^{k,l}(u, v) - x_{m,n}(u, v)|^2}{M \times M \times h^2}\right). \quad (6)$$

where, $x_{m,n}(u, v)$ and $x_{m,n}^{k,l}(u, v)$ are the transform coefficients of the M×M block $B_{m,n}$ and $B_{m,n}^{k,l}$ shown in FIG. 2; u and v represent the transform frequency bands and u, v= 0, . . . , M−1; and h is a parameter that controls the decay of the exponential function and $Z_{m,n}$ is a normalizing factor. Larger Euclidean distance indicates smaller weight $w_{m,n}^{k,l}$.

Figure 3:
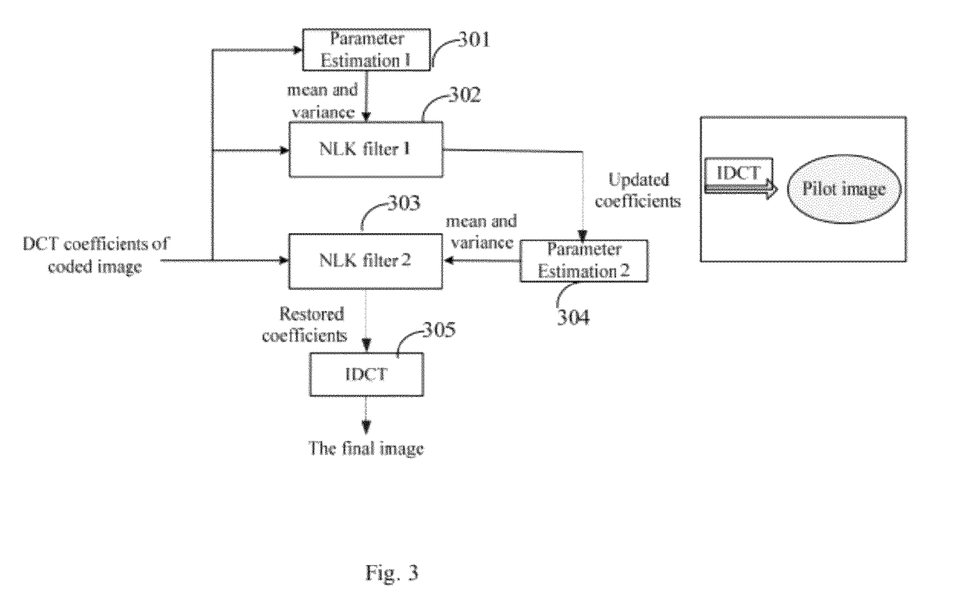

FIG. 3 shows the block diagram of the dual Non-Local Kuan's (DNLK) filter which comprises two NLK filters. The performance of the NLK filter depends on the accuracy of estimated parameters, mean and variance. Accurate parameters for a NLK filter may be obtained from an original image, but the original image is not available. In the DNLK filter, parameters, mean and variance, are estimated in the first estimation unit 301 and coefficients are then updated by the first NLK filter 302. Hereinafter, the updated image, which are used to obtain the parameters, mean and variance, are referred as "pilot image" A pilot image may be unutilized to estimate parameters in the second estimation unit 304, and then perform a restoration process in the second NLK filter 303. The restored coefficients are applied with an Image Discrete Cosine Transform (IDCT) process in IDCT unit 305 so as to form the final image.

The same principle may be used in the case of video data. Hereinabove, the pilot frame is obtained from the updated frame after the first NLK filters. There are many video loop filter methods such as ALF, QALF, QALF+DLF illustrated in background, which have excellent performance without the need of accurate statistic parameters. Any of these methods can be used to obtain pilot frames for the NLK filter. It is shown that the use of QALF+DLF to generate pilot frames produces the best performance Hereinafter, pilot frames refer to the coded frames using QALF+DLF loop filter method.

Embodiment 1

Figure 4:
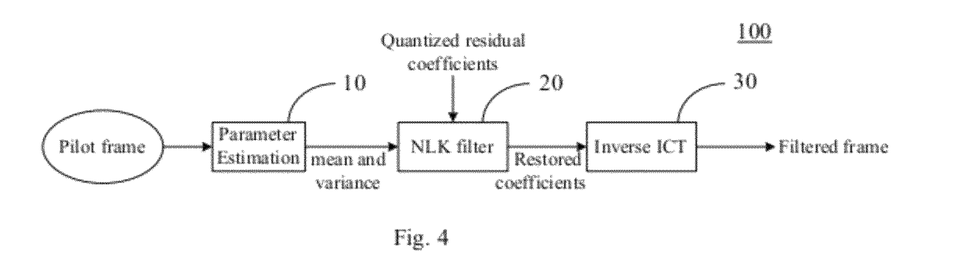

FIG. 4 illustrates a block diagram of a filter 100 according to a first embodiment of the application, which may be referred as an NLK loop filter in this present application. As shown in FIG. 4, the NLK loop filter 100 comprises a parameter estimation unit 10, a NLK filter unit 20 and an inverse ICT unit 30.

Figure 5:
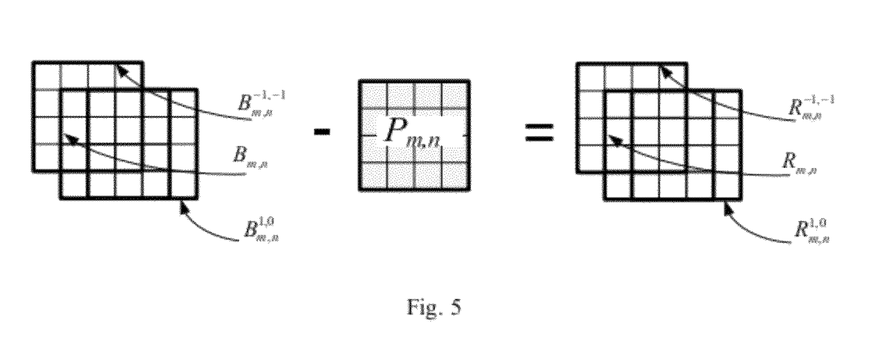

The parameter estimation unit 10 is configured to receive a pilot frame, and then determine means $\bar{x}_0$ and variances $\sigma_{x_0}^2$ from blocks of the pilot frame by the equations (4) and (5), respectively. FIG. 5 shows the operation to obtain the current residual block and its shifted residual blocks in the pilot frame, wherein $P_{m,n}$ is the predicted block corresponding to $B_{m,n}$. And $R_{m,n}$, $R_{m,n}^{-1,-1}$, $R_{m,n}^{1,0}$ are the residual blocks.

As mentioned in the above, the pilot frame is retrieved from the coding process using the QALF+DLF loop filter method.

Figure 1:
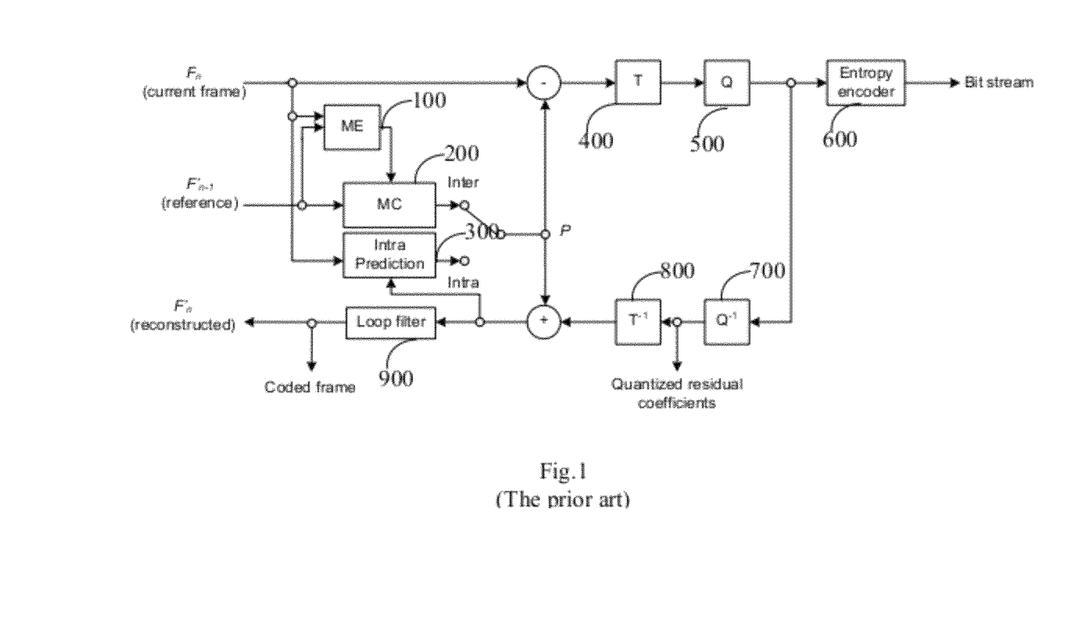

The NLK filter unit 20 is configured to receive each quantized residual coefficient $y_0$. The quantized residual coefficients are obtained in the coding process as shown in FIG. 1, which has been discussed hereinabove. In particular, the quantized residual coefficients are obtained after an inverse quantization by the unit 700 in the encoder. In the case of decoder, the entropy coded coefficients from the encoder 600, together with side information is transmitted to a decoder, in which the coded coefficients are entropy decoded and then inversely quantized to obtain the quantized residual coefficients.

Plus, the unit 20 receives the estimated mean $\bar{x}_0$ and variance $\sigma_{x_0}^2$. The unit 20 operates to restore each coefficient $\bar{x}_0$ according to each received coefficients $y_0$, mean $\bar{x}_0$ and variance $\sigma_{x_0}^2$ by a rule as set forth in equation (2).

Then, the inverse ICT unit 30 applies Inverse Integer Cosine Transform (ICT) to the restored coefficients so as to obtain the filtered frame.

In this embodiment, the NLK filter unit 20 may be replaced by an OCNLK filter unit, which is implemented by the OCNLK as proposed in the prior art.

According to this embodiment, the loop filter method QALF+DLF is enabled to obtain pilot frames, and then the NLK and OCNLK loop filters are utilized directly to restore the quantized residual coefficients. Table I shows the average PSNR improvement at the same bit rates of some coded CIF sequences. Taking the H.264/AVC scheme with deblocking loop filter ON as a benchmarking, OCNLK loop filter performs better for some test sequences. But NLK loop filter fails for all the test sequences.

control information $I_{m,n}$ is needed to determine whether the current block uses $\hat{f}_{m,n}$ or $f_{m,n}$. The block control information $I_{m,n}$ is encoded at the encoder and transmitted to the decoder. The rate of the block control information $I_{m,n}$ and the distortion of the current block need to be considered. The quadtree structure is commonly used to decompose an image into several spatial regions to adaptively identify different types in an image. So the rate-distortion optimization of a quadtree structure is performed to transmit the block control information $I_{m,n}$.

Embodiment 2

Figure 6:
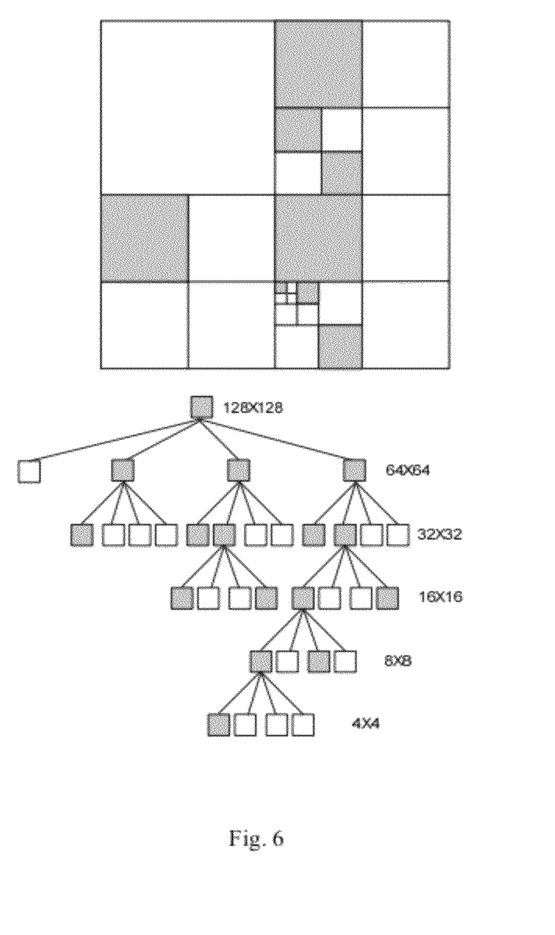

Quadtree is a tree data structure in which each internal node has exactly four children. It is most often used to partition a two dimensional space by recursively subdividing it into four quadrants. FIG. 6 shows a quadtree block partition example. A quadtree-based block partition index as discussed below indicates the NLK or OCNLK filter ON-OFF for each block. The blocks with gray color are selected to use the filters according to the embodiments of the application and other blocks are not filtered. These block controls are coded by context-adaptive binary arithmetic coding (CABAC) as side information and transmitted to the decoder. The block size can be 4, 8, 16, 32, 64, and 128. The decoder then will determine whether to use the proposed filters or not after decoding the transmitted block controls.

Figure 7:
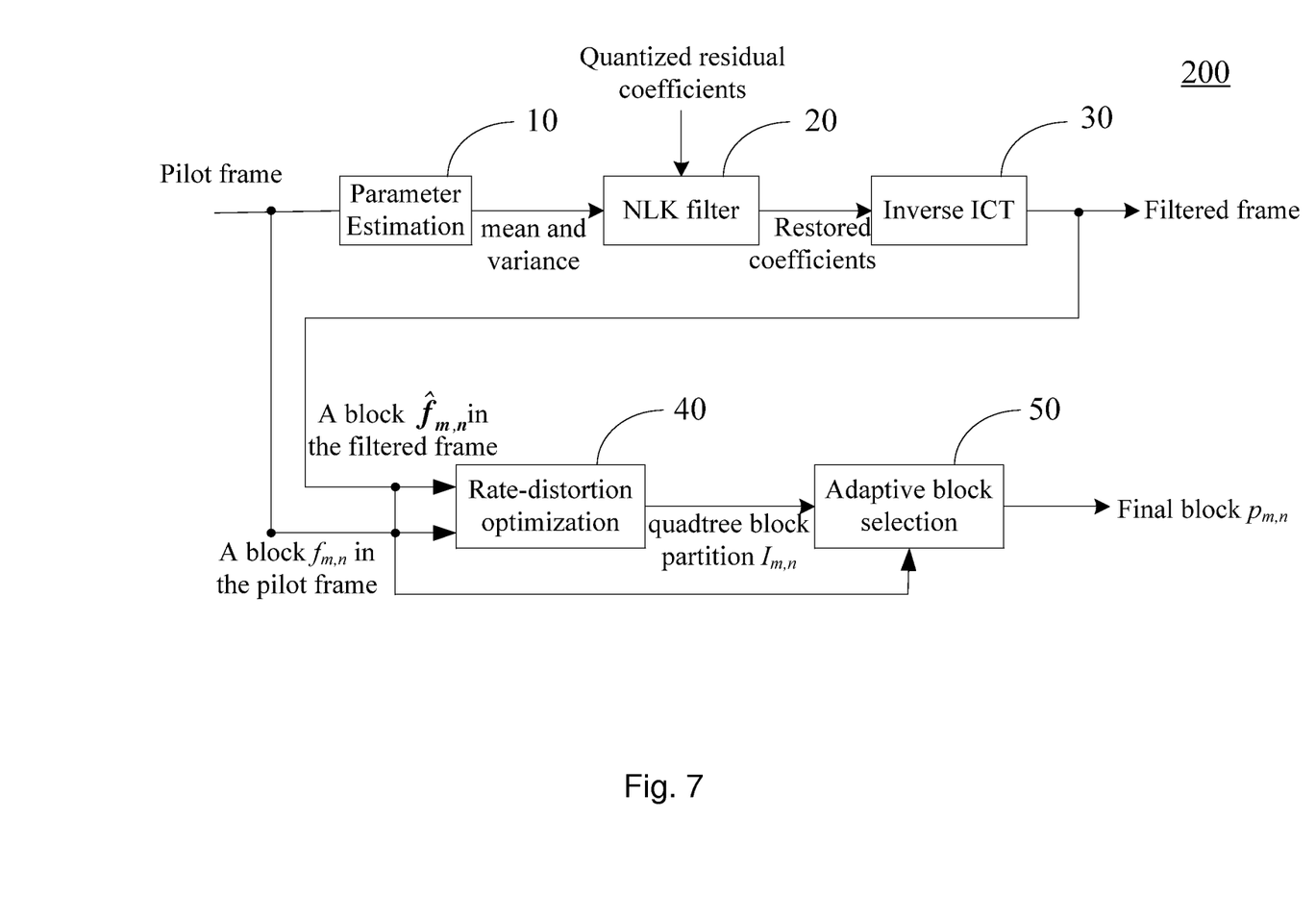

FIG. 7 shows a block diagram of a filter 200 according to a second embodiment of the application, which may be referred as a quadtree-based NLK or OCNLK loop filter (QNLK or QOCNLK). As shown in FIG. 7, the filter 200 comprises a parameter estimation unit 10, a NLK filter unit 20, an inverse ICT unit 30, a rate-distortion optimization unit 40 and an adaptive block selection unit 50.

The units 10, 20 and 30 are identical to those as discussed in the first embodiment, the detailed description thereof are omitted. The rate-distortion optimization unit 40 is configured to receive the filtered frame from the inverse ICT unit 30. The unit 40 is further configured to receive the pilot frame obtained by QALF+DLF without NLK or OCNLK filtering. Then for each M×M block $\hat{f}_{m,n}$ in the filtered frame and each block $f_{m,n}$ in the pilot frame, a quadtree block partition $I_{m,n}$ is determined by a rate-distortion metric as set forth in equation (7) as below.

$$J = D + \lambda R, \qquad (7)$$

where J is the rate-distortion cost, D is a distortion between the processed frame and the original frame, R is the bits for block control side information and $\lambda$ is the lagrangian scaling factor for D and R. The quadtree block partition $I_{m,n}$ will be determined by minimizing the rate-distortion cost J.

TABLE I

Experiental Results By NLK And OCNLK Loop Filters. The H.264/AVC Scheme With DLF On Is Utilized For Benchmarking.

| | Sequence | foreman | carphone | akiyo | football | container | mother_daughter | Average |
|---|---|---|---|---|---|---|---|---|
| ΔPSNR (dB) | NLK | −1.39 | −0.23 | −0.73 | −0.35 | −1.91 | −0.46 | −0.85 |
| | OCNLK | 0.04 | 0.15 | −0.15 | 0.43 | −0.08 | −0.25 | 0.02 |

In the application, block-based technique is applied to the NLK and OCNLK loop filters to selective blocks in each frame. For those blocks not selected, QALF+DLF results are adopted. Let $\hat{f}_{m,n}$ be a block in the filtered frame by NLK or OCNLK filter, and $f_{m,n}$ be a block in the pilot frame by QALF+DLF without the NLK filter. Therefore, the block Based on the determined quadtree block partition $I_{m,n}$ the adaptive block selection unit 50 selects a block from $\hat{f}_{m,n}$ and $f_{m,n}$ according to the following equation (8) as the final block $p_{m,n}$ in each frame and then the final frame will be obtained.

$$p_{m,n} = \hat{f}_{m,n} \times I_{m,n} + f_{m,n} \times (1 - I_{m,n}). \qquad (8)$$

Figure 8:
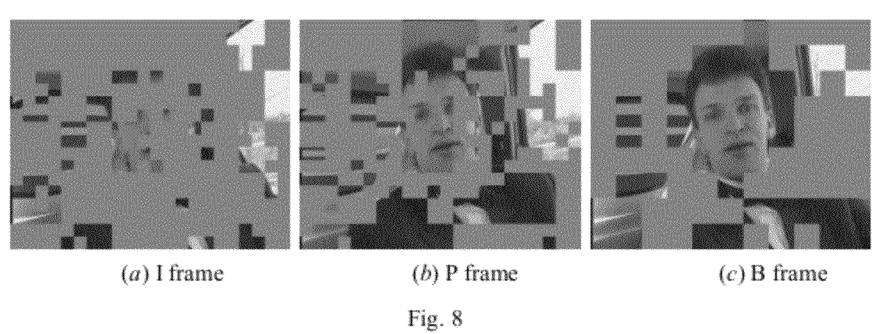

FIG. 8 shows the quadtree-based block partition for I, P, B coded frames of the CIF sequence Carphone. Some factors may determine the block selection as shown in FIG. 8. First of all, the NLK or OCNLK filter takes advantage of the local self-similarity property of video signals. Because of self-similarity, the local neighboring DCT coefficients have high correlations and our filters perform well by capturing the high correlations. The filters perform better at those local regions with higher self-similarity. Secondly, video coding standards use intra and inter prediction, which actually make use of self-similarity property of video signals. When intra or inter predicted blocks are accurate enough for the current block, there is no need to apply the filters. Thirdly, the bits of the block control information are counted in the rate-distortion optimization. They are coded by CABAC as side information. Therefore, the selected blocks are more likely to accumulate to a region. These factors above will influence the block selection results as shown in FIG. 8.

Experimental Results and Analysis of the Proposed Loop Filters

Experiments are implemented within KTA reference software. The test conditions are listed in Table II. Table III shows the experimental results by QALF+DLF, QNLK or QOCNLK methods. All the three methods achieve significant PSNR improvements and save a lot of bit rates than the benchmarking work, H.264 coded sequences. Compared with the state-of-the-art method QALF+DLF, QNLK and QOCNLK methods further achieve on average 1.5% and 2.72% bit rates reduction.

TABLE II

Test conditions

| Software | KTA |
|---|---|
| Test Sequence | 352 × 288 |
| Coding Structure | IBBPBBP |
| Entropy coding | CABAC |
| R-D Optimization | on |
| QP | 20, 26, 32, 38 |
| Frame Number | 100 | ity than QALF+DLF and H.264 coded frames. In the Carphone sequence, blocking artifacts are efficiently removed by the proposed two methods. And in the Football sequence, there are fewer blocking and ringing artifacts in the filtered frame by our methods. In addition, QOCNLK filter slightly performs better than QNLK method. Similar conclusions can be obtained on other test sequences.

Deblocking Loop Filter (DLF) in the prior arts is an enhancement-based technique, because it only performs simple low-pass filters on blocking artifacts boundary. Adaptive Loop Filter (ALF) method is a restoration-based technique. ALF method operates to restore original pixel values in a frame. Only one set of filter coefficients is used for a whole frame, so it is not adaptive to local regions. And the filter coefficients need to be transmitted to decoders. The NLK filter is designed to restore quantized transform coefficients by MMSE. It can also enhance picture quality well with coding artifacts removal. The filter is adaptive to local statistics by capturing high correlations between neighboring transform coefficients. Parameters of NLK and OCNLK filters are estimated from pilot frames. Better estimated parameters can make the NLK and OCNLK filters perform better. Therefore, they can take advantage of any new emerging method to obtain pilot frames.

Features, integers, characteristics, or combinations described in conjunction with a particular aspect, embodiment, implementation or example disclosed herein are to be understood to be applicable to any other aspect, embodiment, implementation or example described herein unless incompatible therewith. All of the features disclosed in this application (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments and extends to any novel one, or any novel combination, of the features disclosed in this specification (including any accompanying claims, abstract and drawings), or to any novel one, or any novel combination, of the steps of any method or process so disclosed.

TABLE III

EXPERIMENTAL RESULTS BY QNLK AND QOCNLK LOOP FILTERS

| | QALF + DLF | | QNLK | | QOCNLK | |
|---|---|---|---|---|---|---|
| Sequence | ΔBR(%) | ΔPSNR(dB) | ΔBR(%) | ΔPSNR(dB) | ΔBR(%) | ΔPSNR(dB) |
| foreman | −4.93 | 0.21 | −6.25 | 0.27 | −7.31 | 0.31 |
| carphone | −3.58 | 0.13 | −5.8 | 0.22 | −7.77 | 0.29 |
| akiyo | −6.14 | 0.28 | −8.16 | 0.38 | −9.59 | 0.44 |
| football | −7.66 | 0.41 | −8.6 | 0.46 | −9.36 | 0.5 |
| container | −7.08 | 0.29 | −7.85 | 0.33 | −8.32 | 0.35 |
| mother_daughter | −5.22 | 0.22 | −6.96 | 0.29 | −8.59 | 0.36 |
| Average | −5.77 | 0.26 | −7.27 | 0.33 | −8.49 | 0.38 |

Figure 9:
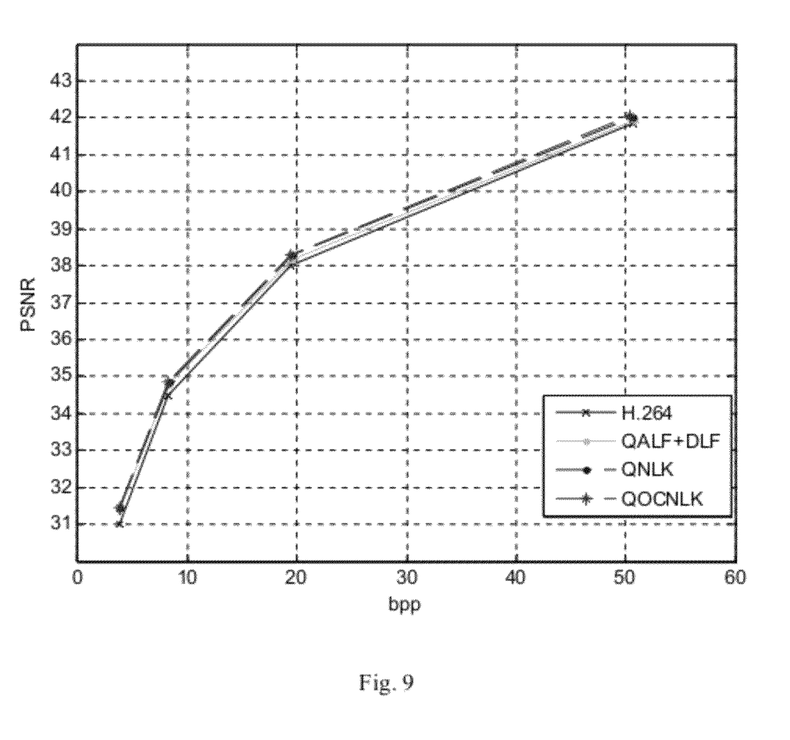
Figure 10:
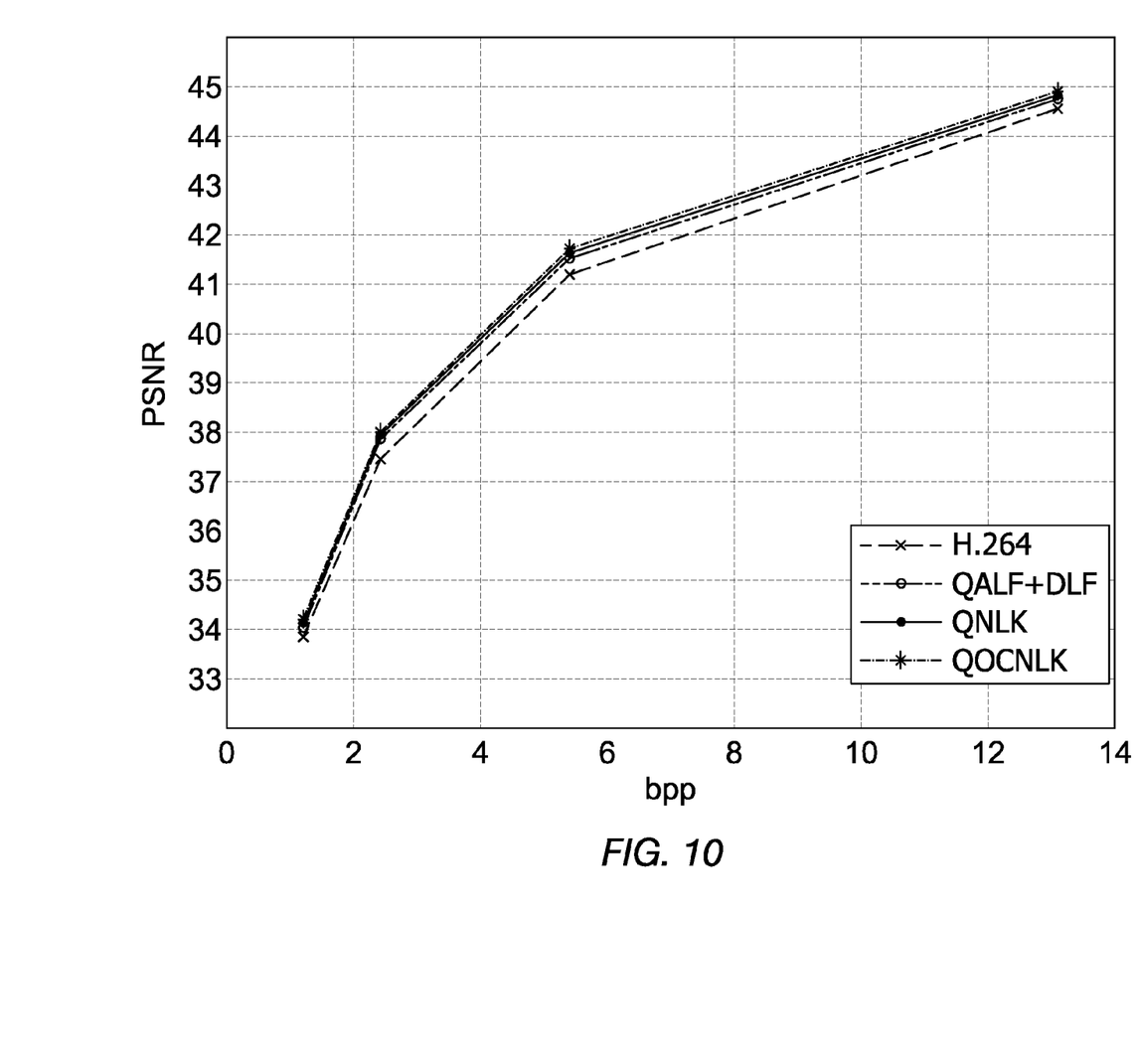
Figure 11:
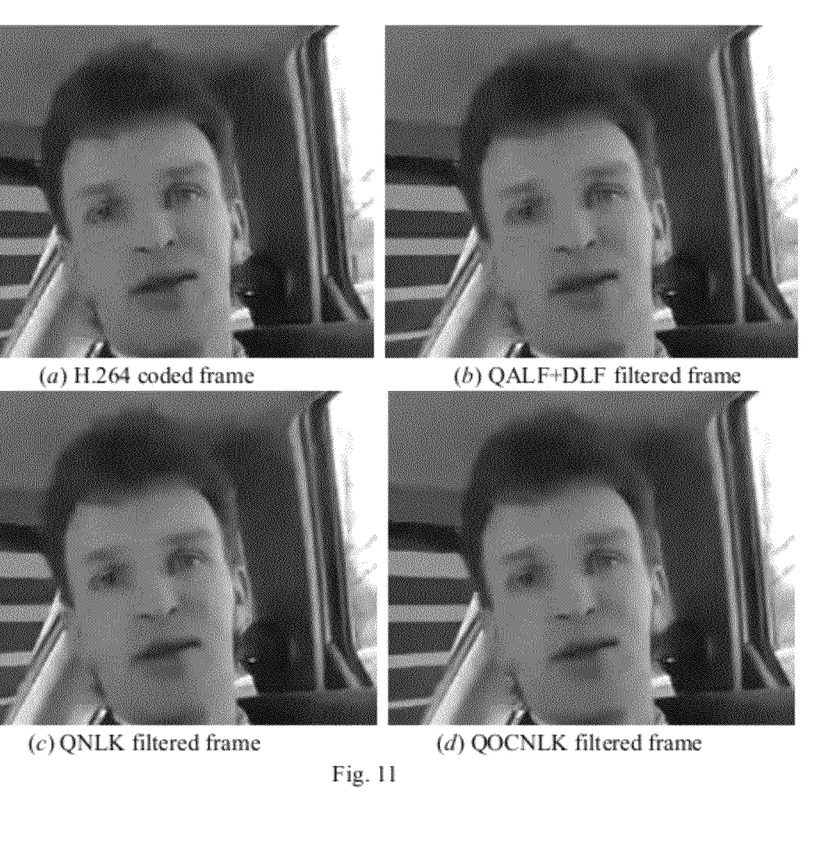
Figure 12:
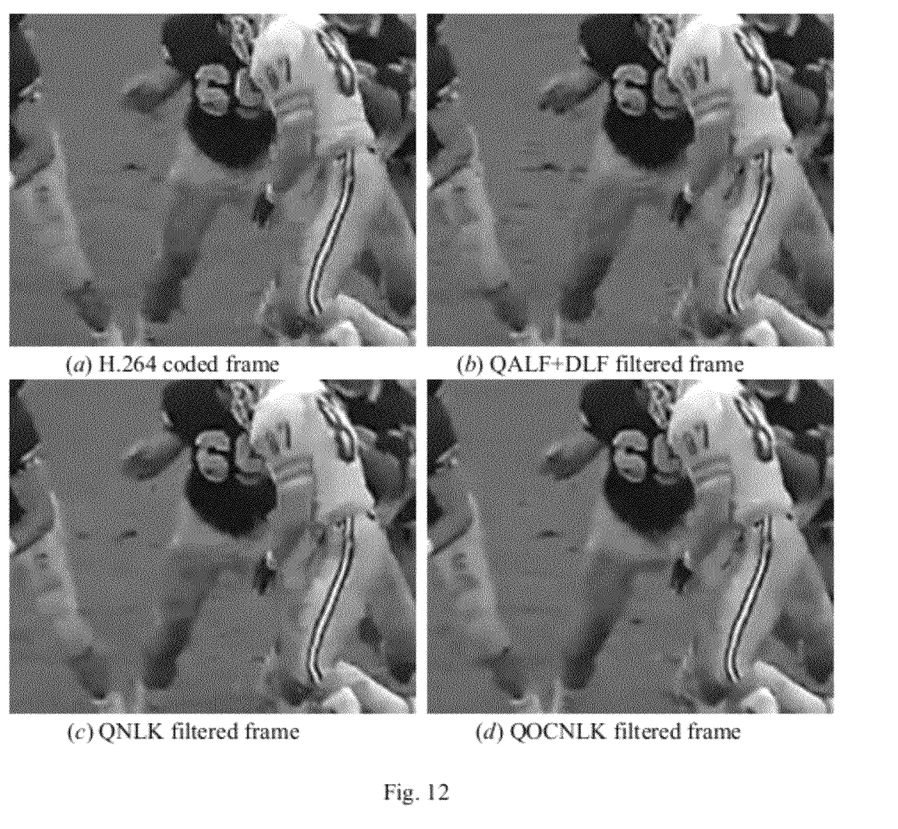

FIG. 9 and FIG. 10 show the R-D curves for two coded sequences: Foreman and Akiyo. The proposed two methods consistently perform well at any coding quality setting. Experiments of visual quality comparison are given in FIG. 11 and FIG. 12. Carphone and Football sequence are used as examples. Compared with H.264 coded frames, higher PSNR values are obtained for QALF+DLF method, but it does not improve picture visual quality much. It is obvious to see that QNLK and QOCNLK filtered frames have better visual qual-

What is claimed is:

1. A video loop filter, comprising:
   a parameter estimation unit configured to determine means and variances from a pilot frame;
   a filter unit configured to receive quantized residual coefficients in video coding process, and restore coefficients from the quantized residual coefficients and the determined means and variances; and an inverse Integer Cosine Transform (ICT) unit configured to apply an inverse ICT to the restored coefficients to obtain a filtered frame,
wherein the filter unit is configured to determine the restored coefficients according to:

$$\hat{x}_0 = \bar{x}_0 + \frac{\sigma_{x_0}^2}{\sigma_{x_0}^2 + \sigma_{n_0}^2}(y_0 - \bar{x}_0),$$

where $\hat{x}_0$ represents the restored coefficients; and
$\bar{x}_0$ and $\sigma_{x_0}^2$ represent the determined means and variances, respectively, and $y_0$ represents the quantized residual coefficients.

2. A filter according to claim 1, wherein the filter unit comprises one of a Non-Local Kuan (NLK) filter unit and an OverComplete Non-Local Kuan (OCNLK) filter unit.

3. A filter according to claim 1, wherein the pilot frame is the coded frame that is obtained using a combined Quadtree Adaptive and Deblocking (QALF+DLF) loop filter.

4. A filter according to claim 1, wherein the filter unit is configured to determine the restored coefficients by linear minimizing mean square error of the quantized residual coefficients and the original coefficients.

5. A filter according to claim 1, further comprising:
a rate-distortion optimization unit configured to determine a quadtree block partition index from blocks in the filtered frame and blocks in the pilot frame; and
an adaptive block selection unit configured to select final blocks from the blocks in the filtered frame and blocks in the pilot frame according to the quadtree block partition index, the final blocks being utilized to form the filtered frame.

6. A filter according to claim 5, wherein the rate-distortion optimization unit determines the quadtree block partition index $I_{m,n}$ by minimizing (D+λR),
where,
D represents a distortion between the processed frame and the original frame,
R represents bits for block control side information, and
λ is the lagrangian scaling factor for D and R.

7. A method for improving video coding performance, comprising:
determining means and variances from a pilot frame;
retrieving quantized residual coefficients in video coding process;
restoring coefficients from quantized residual coefficients and the determined means and variances; and
applying an inverse Integer Cosine Transform (ICT) to the restored coefficients to obtain a filtered frame,
wherein the restored coefficients are calculated according to:

$$\hat{x}_0 = \bar{x}_0 + \frac{\sigma_{x_0}^2}{\sigma_{x_0}^2 + \sigma_{n_0}^2}(y_0 - \bar{x}_0),$$

where $\hat{x}_0$ represents the restored coefficients, and
$\bar{x}_0$ and $\sigma_{x_0}^2$ represent the determined means and variances, respectively, and $y_0$ represents the quantized residual coefficients.

8. A method according to claim 7, wherein the pilot frame is the coded frame that is obtained using a combined Quadtree Adaptive and Deblocking (QALF+DLF) loop filter.

9. A method according to claim 7 wherein the restoring further comprises:
restoring the coefficients by linear minimizing mean square error of the quantized residual coefficients and the original coefficients.

10. A method according to claim 7, further comprising:
determining a quadtree block partition index from blocks in the filtered frame and blocks in the pilot frame based on rate-distortion optimization; and
selecting final blocks according to the quadtree block partition index, the final blocks being utilized to form the filtered frame.

11. A method according to claim 10, wherein the quadtree block partition index Im,n is determined by minimizing (D+λR),
where,
D represents a distortion between the processed frame and the original frame,
R represents bits for block control side information, and
λ is the lagrangian scaling factor for D and R.

12. A video loop filter, comprising:
a parameter estimation unit configured to determine means and variances for coding coefficients of a pilot frame;
a filter unit configured to receive quantized residual coefficients from an image coding process, and restore coding coefficients from the quantized residual coefficients and the determined means and variances;
an inverse Integer Cosine Transform (ICT) unit configured to apply an inverse ICT to the restored coding coefficients to obtain a filtered frame;
a rate-distortion optimization unit configured to determine a quadtree block partition index based on blocks in the filtered frame and blocks in the pilot frame; and
an adaptive block selection unit configured to select final blocks from the blocks in the filtered frame and blocks in the pilot frame according to the quadtree block partition index, the final blocks being utilized to form the filtered frame,
wherein the filter unit is configured to determine the restored coding coefficients according to:

$$\hat{x}_0 = \bar{x}_0 + \frac{\sigma_{x_0}^2}{\sigma_{x_0}^2 + \sigma_{n_0}^2}(y_0 - \bar{x}_0),$$

where $\hat{x}_0$ represents the restored coefficients, and
$\bar{x}_0$ and $\sigma_{x_0}^2$ represent the determined means and variances, respectively, and $y_0$ represents the quantized residual coefficients.

13. A filter according to claim 12, wherein the filter unit comprises one of a Non-Local Kuan (NLK) filter unit and an OverComplete Non-Local Kuan (OCNLK) filter unit.

14. A filter according to claim 12, wherein the pilot frame is the coded frame that is obtained using a combined Quadtree Adaptive and Deblocking (QALF+DLF) loop filter.

15. A filter according to claim 12, wherein the filter unit is configured to determine the restored coding coefficients by minimizing a linear mean square error for the quantized residual coefficients and the determined means and variances.

16. A filter according to claim 12, wherein the rate-distortion optimization unit determines the quadtree block partition index Im,n by minimizing (D+λR),
where,
D represents a distortion between the processed frame and the original frame,
R represents bits for block control side information, and
λ is the lagrangian scaling factor for D and R.

* * * * *

UNITED STATES PATENT AND TRADEMARK OFFICE
CERTIFICATE OF CORRECTION

PATENT NO. : 8,630,356 B2  
APPLICATION NO. : 12/984464  
DATED : January 14, 2014  
INVENTOR(S) : Zhang et al.

Page 1 of 2

It is certified that error appears in the above-identified patent and that said Letters Patent is hereby corrected as shown below:

On the Title Page

In column 2 (page 1, item 56) at line 15, Under Other Publications, change "Entroy" to --Entropy--.

In column 2 (page 1, item 56) at line 17, Under Other Publications, change "Discreate" to --Discrete--.

Page 1 (item 57, Abstract) at line 3, change "performance" to --performance.--.

In the Specification

In column 1 at line 42, Change "the a" to --the--.

In column 2 at line 28, Change "Conf" to --Conf.--.

In column 3 at line 53, Change " $B_{m,n}{}^{k,l}$ " to -- $B_{m,n}^{k,l}$ --.

In column 3 at line 60, Change " $B_{m,n}{}^{k,l}$ " to -- $B_{m,n}^{k,l}$ --.

In column 4 at line 32, Change " $w_{m,n}{}^{k,l}$ " to -- $w_{m,n}^{k,l}$ --.

In column 4 at line 40, Change " $x_{m,n}{}^{k,l}(u,v)$ " to -- $x_{m,n}^{k,l}(u,v)$ --.

In column 4 at line 41, Change " $B_{m,n}{}^{k,l}$ " to -- $B_{m,n}^{k,l}$ --.

In column 4 at line 45, Change " $w_{m,n}{}^{k,l}$ " to -- $w_{m,n}^{k,l}$ --.

In column 4 at line 56, Change "unutilized" to --utilized--.

In column 4 at line 59, Change "Image" to --Inverse--.

In column 5 at line 3, Change "performance" to --performance.--.

In column 5 at line 18, Change "$B_{m,n}$. And" to --$B_{m,n}$, and--.

Signed and Sealed this  
Eighth Day of July, 2014

Michelle K. Lee  
*Deputy Director of the United States Patent and Trademark Office*

CERTIFICATE OF CORRECTION (continued)
U.S. Pat. No. 8,630,356 B2

In column 5 at line 33, Change "$\overline{x}_0$" to --$\hat{x}_0$--.

In column 5 (TABLE 1) at line 53 (approx.), Change "Experiental" to --Experimental--.

In the Claims

In column 10 at line 9, in claim 11, Change "Im,n" to --$I_{m,n}$--.

In column 10 at line 60, in claim 16, Change "Im,n" to --$I_{m,n}$--.